United States Patent

Heishi et al.

[11] Patent Number: 4,732,197
[45] Date of Patent: Mar. 22, 1988

[54] PNEUMATIC TIRE

[75] Inventors: Seiichiro Heishi, Kyoto; Koji Takahira, Nara, both of Japan

[73] Assignee: Toyo Tire & Rubber Co., Ltd., Osaka, Japan

[21] Appl. No.: 736,986

[22] Filed: May 23, 1985

Related U.S. Application Data

[63] Continuation of Ser. No. 461,976, Jan. 26, 1983, abandoned.

[30] Foreign Application Priority Data

Jan. 28, 1982 [JP] Japan ................................. 57-12103

[51] Int. Cl.[4] ............................................. B60C 9/18
[52] U.S. Cl. ................................... 152/451; 57/902; 148/12 B; 152/527
[58] Field of Search .................. 152/451, 527, 556; 57/902; 428/625, 677; 148/12 B, 12.4

[56] References Cited

U.S. PATENT DOCUMENTS

| | | | |
|---|---|---|---|
| 3,990,887 | 11/1976 | Hisada | 148/12 B X |
| 4,011,899 | 3/1977 | Chamberlin | 152/359 |
| 4,020,887 | 5/1977 | Vlasov et al. | 152/359 |
| 4,106,957 | 8/1978 | Tournoy | 152/451 X |
| 4,176,513 | 12/1979 | Young et al. | 152/359 |
| 4,268,573 | 5/1981 | Baillievier | 428/295 |

FOREIGN PATENT DOCUMENTS

| | | | |
|---|---|---|---|
| 53-30505 | 3/1978 | Japan | 152/527 |
| 57-51502 | 3/1982 | Japan | |
| 0661037 | 5/1979 | U.S.S.R. | 148/12 B |

OTHER PUBLICATIONS

*Metals Handbook*, 9th Ed., vol. 1: "Properties and Selection: Irons and Steels", ASM 1978.
Blow, C. M., *Rubber Technology and Manufacture*, CRC Press, 1971, p. 400 and p. 220.
Haemers, G. "Steel Cord-Rubber Adhesion: State of the Art", *Rubber World*, Sep. 1980, pp. 26–30.
Japanese Industrial Standard, Piano Wire Rods, Japanese Standards Assoc., JIS G 3502, Table 1, 1980.

*Primary Examiner*—Donald E. Czaja
*Assistant Examiner*—Ramon R. Hoch
*Attorney, Agent, or Firm*—Wenderoth, Lind & Ponack

[57] ABSTRACT

A pneumatic tire at least partially reinforced with steel cords. Most of steel filaments of said steel cords comprise iron materials having carbon content of 0.75 to 0.85 percent by weight. Said steel cords have an preferred tensile strength (TS) calculated from the following formula;

$$\frac{(A + 345)W}{7.86} < TS < \frac{(A + 395)W}{7.86}$$

$$A = -177D - 1.84N + 0.02N^2$$

wherein W is the weight (g/m) of a steel cord, D is the diameter (mm) of the steel filament and N is the number of steel filaments of a steel cord and said steel cords also have a maintenance ratio of the knot strength of more than 60%.

5 Claims, 1 Drawing Figure

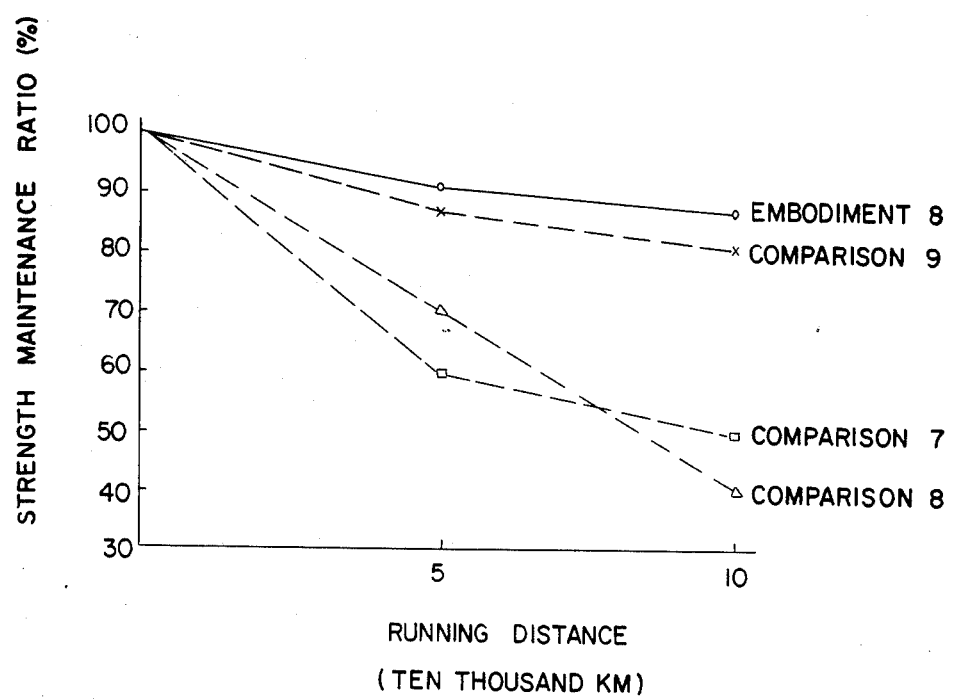

PNEUMATIC TIRE

This application is a continuation of now abandoned application Ser. No. 461,976 filed Jan. 26, 1983.

BACKGROUND OF THE INVENTION

1. Field of the Invention

The present invention relates to a pneumatic tire reinforced with steel cords.

Pneumatic tires reinforced with steel cords have been used preferably for high speed and heavy load vehicles for transportation as well as construction vehicles. But due to the heavy specific gravity of steel cords, the weight of tires becomes heavy so that a large amount of fuel has been consumed.

2. Prior Art

In order to reduce the tire weight, it has been attempted to use a specially compounded rubber or to reduce the thickness of rubber in some portions, to the extent that reduced faults occur in the tire functions. But the amount of steel cords has not been reduced because if the amount of steel cords is reduced, the safety ratio of tires is lowered.

Besides, in a pneumatic radical tire reinforced with steel cords, concentration of stress usually occurs at the interface between rigid steel cords and flexible rubber, thereby readily causing rubber separation from the end portions of steel cords or rubber separation in belt plies in a radial tire. Moreover, a conventional pneumatic tire reinforced with steel cords caused a separation failure due to detachment of a surface metal plating induced by water penetration into an interface between an iron body and a surface metal plating of steel cords when being exposed to high temperature and high humidity for a long time.

The inventors have conducted various investigations and experiments in order to reduce the amount of steel cords in order to lighten tire weight and thereby decreasing fuel consumption and diminishing separation failures in a pneumatic tire. As a result, in Japanese Patent Application No. 55-125625 laid open on Mar. 26, 1982 under No. 57-51502 the inventors proposed a pneumatic tire reinforced at least partially with steel cords in which most of steel filaments of steel cords comprise an iron material containing carbon at 0.75% to 0.85% by weight and the steel cords have the tensile strength calculated by the following formulas;

$$\frac{(A + 345) W}{7.86} < TS < \frac{(A + 395) W}{7.86} \quad 1$$

$$A = -177 D - 1.84 N + 0.02 N^2 \quad 2$$

In the above formulas, D is the diameter (mm) of steel filaments of a steel cord. N is the number of steel filaments of a steel cord. W is the weight (g) of a steel cord per 1 m. TS is tensile strength (kg) of a steel cord. The denominator, 7.86, shows the specific gravity of iron. The above formula (1) and (2) are applied in the range of N being 3 to 50 and D being 0.15 to 0.40. If D is less than 0.15 mm, productivity is poor and production is not practical because of high cost. If D is more than 0.40 mm, the rigidity of a steel cord becomes too high so that the tire easily undergoes separation, and fatigue resistance is reduced. In respect to N, when the diameters of the core filaments are different from each other and outer filaments, the number, m, of core filaments shall be taken as 1 to be added to the number, n, of outer filaments. Namely, N is taken as n+1.

On the other hand, the tensile strength of conventional steel cords used for tires can be calculated by the formula;

$$\frac{(A + 285) W}{7.86} < TS < \frac{(A + 335) W}{7.86}$$

In order to obtain a steel cord having the tensile strength satisfying TS value according to the above formula 1, the carbon content in an iron material for steel filaments should be in the range of 0.75 wt% to 0.85 wt% which is more than the carbon content 0.69 wt% to 0.73 wt% in conventional steel filaments. In case of a carbon content less than 0.75 wt%, the tensile strength is low. A carbon content more than 0.85 wt% makes heat treatment of the steel filaments very difficult and results in a deficiency in tenacity of the steel cord obtained. As a result, when a pneumatic tire employing such steel cords treads on projections and the like, they are readily broken down.

The steel filaments containing the above mentioned amount of carbon are brass-plated in order to increase the adhesiveness thereof to rubber. The preferable composition ratio of the brass is 60 wt% to 70 wt% copper and 30 wt% to 40 wt% zinc. If copper contained in brass is less than 60 wt%, the brass has a $\beta$ phase so that such brass-plated irons are impossible to be drawn into steel filaments in cooperation with the high hardness of iron materials. If copper contained in brass is more than 70 wt%, pin holes are formed on the brass when steel filaments are drawn. One of the special findings in said invention is that no breakage occurs between the steel filaments and the brass when a tire is exposed to high temperature and high humidity, by virtue of firm bonding between steel filaments having high carbon content and plated brass. This is because higher pressure is applicable to materials in a wet-drawing process using a lubricant than in a drawing process for conventional materials containing low carbon, so that brass is pressed on and bonded to iron cores when the materials pass through drawing dies. Assuming that the strength of tires is uniform, the reinforcing effect of a steel cord is small if the tensile strength of a steel cord is smaller than the value calculated from said formulae 1 and 2. Accordingly, the amount of steel cords can not be reduced. As a result, tire weight and fuel consumption are not so different from those of tires employing conventional steel cords. If on the contrary the tensile strength of a steel cord is bigger than the value calculated from said formula 1 and 2, the amount of steel cords corresponding to the increased amount of the tensile strength can be reduced in order to maintain the same strength as that of a tire comprising conventional steel cords. But the rigidity of a tire and the rigidity of the composite of rubber and steel cords become small so that the wear resistance of a tire diminishes.

The above described pneumatic tire provided by the senior Japanese patent application is lighter in weight and smaller in rolling resistance and fuel consumption than a conventional tire and also it enjoys superior moisture heat coverage. But a separation failure has been experienced at a belt portion when said tire treads on a projection like a nail. Said separation results from the deterioration of strength of belt portion due to accidental cutting of steel cords contained therein. Our investigation reveals that it is attributed to the fact that the knot strength of steel cords is lowered with the increase in tensile strength thereof.

SUMMARY OF THE INVENTION

Accordingly, it is the object of the present invention to improve the senior Japanese patent application and to provide a pneumatic tire reinforced by steel cords having the preferred tensile strength and having light weight, low rolling resistance and small fuel consumption and moreover, being free from separation failure by virtue of the increase of the knot strength of steel cords.

According to the present invention, a pneumatic tire at least partially reinforced by steel cords is constructed as follows. Namely, most of steel filaments of said steel cords comprise iron materials having carbon content of 0.75 wt% to 0.85 wt% and said steel cords have a tensile strength calculated from the following formula;

$$\frac{(A + 345)W}{7.86} < TS < \frac{(A + 395)W}{7.86}$$

$$A = -177D - 1.84N + 0.02N^2$$

In the above formulae, D is the diameter (mm) of steel filaments of steel cords. N is the number of steel filaments of a steel cord. W is the weight (g) of a steel cord per 1 m. and TS is tensile strength (kg) of a steel cord. The denominator, 7.86 is the specific gravity of iron. Moreover, said steel cords have a maintenance rate of knot strength of more than 60%.

In order to maintain the knot strength of more than 60% while keeping the tensile strength at a preferred value, our investigation reveals that the reduction ratio from an iron material to a steel filament should be less than 97.3% and the size of non-metallic inclusion in an iron material such as non-ductile aluminum oxide, silica, etc. should be less than 10μ. The knot strength of a steel cord is measured according to JIS-L 1017. The reduction ratio (R) is calculated by the following formula.

$$R (\%) = \frac{S_o - S}{S_o} \times 100$$

In the above formula, So is the sectional area of the iron material. S is the sectional area of the steel filament. The sizes of non-metallic inclusions are measured in accordance with JIS-G0555.

BRIEF DESCRIPTION OF THE DRAWING

Represented in the drawing is a graph showing the relationship between the running distance and strength maintenance ratio relative to Embodiment 3 according to the present invention and comparison examples 7 to 9.

DETAILED DESCRIPTION OF THE INVENTION

Foregoing description relative to the senior Japanese patent application is also applicable to the present invention. Accordingly, the description is hereinafter is only made with respect to an embodiment having a preferred tensile strength as well as a preferred maintenance ratio of the knot strength and with respect to comparison tires.

Embodiment 1

SWRS 82A specified by JIS-G3502 was chosen for the iron material of steel filaments according to the present invention. SWRS 72A was chosen for comparison purpose. Brass having the copper/zinc ratio of 67/33 was plated on both iron materials in the amount of 5.5 g/kg.

Steel filaments thus constructed were twisted with a double twister of the buncher type at the speed of 4,000 rpm to obtain steel cords of 1×4×0.22 mm having a twisting pitch of 10 mm. Radial tires 165SR13 were produced which comprised a belt layer containing said steel cords and a carcass layer containing polyester cords. The properties of the above steel filaments and of the steel cords are shown in Table 1. The properties of tires are shown in Table 2.

Rubber compositions used for making the tires in the Embodiments are as shown below.

|  | (percent by weight) |
|---|---|
| Natural rubber | 100 |
| Carbon black (HAF) | 55 |
| ZnO | 7 |
| Stearic acid | 1 |
| Trimethyl-dihydroquinone polymer | 2 |
| SiO$_2$ | 8 |
| Resorcin | 2.5 |
| Melamine derivative | 2.5 |
| Cobalt naphthenate | 2.5 |
| Sulfur | 4 |
| Dicyclohexyl-benzthiazyl-sulfenamide | 0.8 |

TABLE 1

|  |  | Embodiment 1 | Comparison 1 | Comparison 2 | Comparison 3 |
|---|---|---|---|---|---|
| Steel filament | Material | SWRS 82A | SWRH 82A | SWRS 82A | SWRS 72A |
|  | Carbon content (%) | 0.81 | 0.81 | 0.81 | 0.70 |
|  | Largest size of non-metallic inclusion (μ) | 5 | 57 | 6 | 6 |
|  | Reduction ratio (%) | 96.5 | 96.5 | 97.5 | 96.5 |
|  | Diameter (mm) | 0.219 | 0.220 | 0.220 | 0.219 |
| Steel cord | Weight (g/m) | 1.20 | 1.20 | 1.20 | 1.20 |
|  | Tensile strength (kg) | 51.1 | 51.3 | 54.2 | 44.0 |
|  | Calculation value (kg) maximum | 45.7 | 45.7 | 45.7 | 36.5 |
|  | Calculation value (kg) minimum | 53.3 | 53.3 | 53.3 | 44.1 |
|  | Maintenance ratio of knot strength (%) | 63 | 54 | 57 | 69 |

TABLE 2

|  | Embodiment 1 | Comparison 1 | Comparison 2 | Comparison 3 |
|---|---|---|---|---|
| Belt ply | 2 | 2 | 2 | 2 |
| End count per 25 mm | 19.3 | 19.2 | 18.2 | 22 |
| Belt strength (kg/25 mm) | 1973 | 1970 | 1973 | 1971 |
| Steel cord amount (g) per tire | 402 | 401 | 380 | 460 |
| Tire weight (kg) | 7.41 | 7.41 | 7.39 | 7.50 |
| High speed durability | pass | pass | pass | pass |
| Rolling resistance | 110 | 111 | 110 | 100 |
| Fuel consumption | 98 | 97 | 98 | 100 |
| Moisture heat coverage (%) | 95 | 93 | 98 | 70 |
| Cut number of steel cords per tire | 15 | 243 | 102 | 10 |
| Wear Resistance | 100 | 100 | 88 | 100 |

High speed durability shown in Table 2 was measured in accordance with the drum test specified in U.S. FMVSS No. 109. The rolling resistance was measured as follows.

Test tires were mounted to a 1600 cc passenger car and a running distance by inertia was evaluated after releasing a clutch at a prescribed point with a running speed of 60 km/h.

Respective values are indicated in the form of index by setting the running distance of the comparison 3 to be 100.

The fuel comparison was measured after running the distance of 40 km and the values were indicated in the form of the index by setting the fuel consumption of the comparison 3 to be 100. Moisture heat coverage shows the rubber amount by percentage which adheres to the steel cords when the tires are disassembled to separate belt plies from each other after being exposed to the environment of 70° C., 95% RH for two weeks.

The number of the steel cords broken were measured by X-ray photographing the steel cords disposed at the belt portion of test tires. Test tires were mounted to a 1600 cc passenger car and ran the distance of 5,000 km at 30 km/h on a test track on which macadams having a size of 3 cm$^3$ in average were scattered all over the surface.

As apparent from the test results shown in Table 2, the number of the broken steel cords of the Embodiment 1 is smaller than those of the comparisons 2 and 3 whose knot strengths are small and not so different from that of comparison 3 relating to a prior art embodiment having small tensile strength. It shall be also understood that the comparison 2 including steel cords of higher tensile strength in comparison to Embodiment 1, is inferior in wear resistance due to low rigidity of the tread portion.

Embodiment 2

The same steel filaments as in Table 1 were twisted in the same manner and the steel cords of 3×0.20 mm+6×0.35 mm were obtained. Radial tires 1000R-2014 PR were produced which comprised a belt layer including said steel cords and a carcass layer of four plies made of polyester cords. The brass plate used for the steel filaments was a copper/zinc ratio of 63/37 and the amount was 5 g/kg.

TABLE 3

| Steel filament | | | Embodiment 2 | Comparison 4 | Comparison 5 | Comparison 6 |
|---|---|---|---|---|---|---|
| Steel filament | Material | | SWRS 82A | SWRH 82A | SWRS 82A | SWRS 72A |
| | Reduction rate (%) | Core filaments | 96.5 | 96.5 | 97.5 | 96.0 |
| | | Outer filaments | 96.0 | 96.0 | 97.4 | 95.7 |
| | Diameter (mm) | Core filaments | 0.20 | 0.20 | 0.20 | 0.20 |
| | | Outer filaments | 0.35 | 0.35 | 0.35 | 0.35 |
| Steel cord | Weight (g/m) | | 5.35 | 5.35 | 5.35 | 5.35 |
| | Tensile strength (kg) | | 197 | 196 | 220 | 164 |
| | Calculation value (kg) | maximum | 184.6 | 184.6 | 184.6 | 143.7 |
| | | minimum | 218.6 | 218.6 | 218.6 | 177.8 |
| | Maintenance ratio of knot strength (%) | | 65 | 54 | 57 | 68 |

TABLE 4

| | Embodiment 2 | Comparison 4 | Comparison 5 | Comparison 6 |
|---|---|---|---|---|
| Belt ply | 4 | 4 | 4 | 4 |
| End count per 25 mm | 11.7 | 11.8 | 10.5 | 14 |
| Belt strength (kg/25 mm) | 9220 | 9252 | 9240 | 9240 |
| Steel cord amount (kg) per tire | 4.25 | 4.30 | 3.81 | 5.10 |
| Tire weight (kg) | 47.2 | 47.1 | 47.0 | 48.1 |
| High speed durability | pass | pass | failure | pass |
| Rolling resistance | 115 | 115 | 117 | 100 |
| Fuel consumption | 97 | 97 | 96 | 100 |
| Moisture heat coverage (%) | 95 | 93 | 96 | 68 |
| Cut number of steel cords per tire | 19 | 628 | 493 | 21 |
| Wear Resistance | 100 | 95 | 91 | 100 |
| XMA analysis rubber side | 10 | 13 | 9 | 64 |
| cord side | 90 | 87 | 91 | 36 |

Rolling resistance, fuel consumption and wear resistance in Table 4 are shown in the form of index value by setting the test value of comparison 6 to be 100. The figures for the cut number of steel cords and wear resistance are test values taken after a 6,500 km run along a bad road of a dumpcart, for transportation of macadams which was mounted with the respective tires according to Embodiment 2 and comparisons 4 to 6. Belt plies are subjected to great shock due to running along a bad road of a dumpcart so that fatigue resistance and tenacity are desired. The figures of XMA analysis are test values measured at broken portions of interface between steel cords and rubber by means of an X-ray micro-analyser after the measurement of moisture heat coverage. To be small in the value of cord side means that brass plated was taken off on the rubber side and that the bonding strength of brass with iron material was weak.

As shown in Tables 3 and 4, comparison 4 and comparison 5 employing steel cords having small knot strength are very large in the cut number of steel cords and inferior in wear resistance.

Embodiment 3

Steel cords of 3+9+15×0.175 mm+1 were prepared in the same manner as described in Embodiment 2. The same radial tires as described in Embodiment 2 were produced with the exception that one ply of carcass layer employing said steel cords was used instead of 4 plies of carcass layer employing polyester cords.

TABLE 5

| | | Embodiment 3 | Comparison 7 | Comparison 8 | Comparison 9 |
|---|---|---|---|---|---|
| Steel filament | Material | SWRS 82A | SWRH 82A | SWRS 82A | SWRS 72A |
| | Reduction ratio (%) | 96.5 | 96.5 | 97.7 | 96.0 |
| | Diameter (mm) | 0.175 | 0.175 | 0.175 | 0.175 |
| Steel cord | Weight (g/m) | 5.22 | 5.22 | 5.22 | 5.22 |
| | Tensile strength (kg) | 201.0 | 202.7 | 223.2 | 174.8 |
| | Calculation value (kg) maximum | 185.2 | 185.2 | 185.2 | 145.4 |
| | minimum | 218.4 | 218.4 | 218.4 | 178.6 |
| | Maintenance ratio of knot strength (%) | 62 | 55 | 56 | 68 |

TABLE 6

| | Embodiment 3 | Comparison 7 | Comparison 8 | Comparison 9 |
|---|---|---|---|---|
| Belt ply | 4 | 4 | 4 | 4 |
| End count per 25 mm | 11.3 | 11.2 | 10.2 | 13 |
| Carcass strength (kg/25 mm) | 2271 | 2270 | 2278 | 2272 |
| Steel cord amount for carcass (kg) per tire | 3.80 | 3.27 | 2.98 | 3.80 |
| Tire weight (kg) | 49.3 | 49.6 | 49.0 | 51.0 |
| High speed durability | pass | pass | pass | pass |
| Rolling resistance | 114 | 113 | 116 | 100 |
| Fuel consumption | 95 | 97 | 93 | 100 |
| Moisture heat coverage (%) | 100 | 95 | 100 | 68 |
| Cut number of belt cords per tire (kg) | 22 | 711 | 562 | 36 |
| Wear resistance (100,000 km) | 105 | 97 | 87 | 100 |
| XMA analysis rubber side | 95 | 95 | 97 | 55 |
| XMA analysis cord side | 5 | 5 | 3 | 45 |

Rolling resistance and fuel consumption are shown in the form of index value by setting a test value of comparison 9 to be 100. Wear resistance was measured at 100,000 km running along a good road.

The accompanying FIGURE represents strength maintenance ratio or fatigue resistance at 50,000 km running and 100,000 km running. The Embodiment 3 and comparison 9 are superior in the strength maintenance ratio of fatigue resistance, but comparison 7 and comparison 8 are inferior.

Embodiment 4

Four steel filaments of Embodiment 1 were twisted at 3,000 rpm around 440 d (0.234 mm φ) of nylon monofilament by means of a tubular type twister to obtain steel cords of 1×0.234 mm+4×0.22 mm having a twisting pitch of 10 mm. Radial tires 165SR13 having a belt layer of said steel cords were produced as described in Embodiment 1.

TABLE 7

| | | Embodiment 4 | Comparison 10 | Comparison 11 | Comparison 12 |
|---|---|---|---|---|---|
| Steel filament | Material | SWRS 82A | SWRH 82A | SWRS 82A | SWRS 72A |
| | Reduction ratio (%) | 96.5 | 96.5 | 97.5 | 96.5 |
| | Diameter (mm) | 0.219 | 0.220 | 0.220 | 0.219 |
| Steel cord | Weight (g/m) | 1.22 | 1.22 | 1.22 | 1.22 |
| | Tensile strength (kg) | 51.2 | 51.3 | 54.3 | 44.0 |
| | Calculation value (kg) maximum | 46.4 | 46.4 | 46.4 | 37.1 |
| | Calculation value (kg) minimum | 54.2 | 54.2 | 54.2 | 44.9 |
| | Maintenance ratio of knot strength (%) | 70 | 53 | 57 | 69 |

TABLE 8

| | Embodiment 4 | Comparison 10 | Comparison 11 | Comparison 12 |
|---|---|---|---|---|
| Belt ply | 2 | 2 | 2 | 2 |
| End count per 25 mm | 18.9 | 18.9 | 17.8 | 22.0 |
| Steel cord amount (g) per tire | 395 | 395 | 372 | 460 |
| Tire weight (kg) | 7.42 | 7.42 | 7.40 | 7.50 |
| High speed durability | accepted | accepted | accepted | accepted |
| Rolling resistance | 111 | 111 | 110 | 100 |
| Fuel consumption | 98 | 98 | 98 | 100 |
| Moisture heat coverage (%) | 100 | 95 | 98 | 76 |
| Cut number of steel cords per tire (kg) | 2 | 268 | 126 | 7 |
| Wear Resistance | 100 | 98 | 77 | 100 |

Rolling resistance, fuel consumption and wear resistance are shown in the form of index value by setting a test value of comparison 12 to be 100.

Summing up the test results described relative to Table 1 to Table 8, it can be said that tires employing steel cords including steel filament material SWRS82A are lighter in weight as the use amount of steel cords can be reduced and improved in rolling resistance and fuel consumption in comparison with conventional tires. But a large number of steel cords are broken during tire running when the maintenance ratio of knot strength is less than 60%. On the other hand, in the pneumatic tires of Embodiment 1 to Embodiment 4 according to the present invention, the number of broken steel cords during running is as small as in conventional tires or rather superior to that of conventional tires and besides, wear resistance is superior.

What is claimed is:

1. A pneumatic tire at least partially reinforced with steel cords comprising steel filaments SWRS 82 A, as specified by JIS G 3502, containing 0.80 to 0.85 wt. % C, 0.12 to 0.32 wt. % Si, 0.30 to 0.60% Mn, 0.025 wt. % max. P, 0.025 wt. % max. S and 0.20 wt. % max. Cu, most of said steel filaments of said steel cords comprising iron materials having non-metallic inclusions of 10μ or less for any given inclusion cross-section, said steel cords having the tensile strength calculated from the following formula:

$$\frac{(A + 345)W}{7.86} < TS < \frac{(A + 395)W}{7.86} \qquad \text{I}$$

$$A = -177D - 1.84N + 0.02N^2$$

wherein D is the diameter (mm) of the steel filament, N is the number of steel filaments of a steel cord, W is the weight (g/m) of a steel cord, TS is the tensile strength (kg) and the denominator 7.86 is the specific gravity of iron, and the maintenance ratio of the knot strength of said steel cords is more than 60%.

2. The pneumatic tire claimed in claim 1 wherein said steel filaments are plated with brass having 60 wt% to 70 wt% copper and 30 wt% to 40 wt% zinc.

3. The pneumatic tire claimed in claim 1 wherein said cords are used for a breaker layer.

4. The pneumatic tire as claimed in claim 1, wherein the reduction ratio of said iron material to said steel filament is less than 97.3%.

5. The pneumatic tire as claimed in claim 4, wherein the reduction ratio of said iron material to said steel filament is 96.5 to 97.3%.

* * * * *